(12) United States Patent
Travis et al.

(10) Patent No.: US 9,759,919 B2
(45) Date of Patent: Sep. 12, 2017

(54) VIRTUAL IMAGE DISPLAY WITH CURVED LIGHT PATH

(71) Applicant: Microsoft Technology Licensing, LLC, Redmond, WA (US)

(72) Inventors: Adrian Travis, Paris (FR); Joel S. Kollin, Seattle, WA (US); Andreas Georgiou, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/589,513

(22) Filed: Jan. 5, 2015

(65) Prior Publication Data

US 2016/0195720 A1    Jul. 7, 2016

(51) Int. Cl.
G02B 27/01    (2006.01)
G02B 26/08    (2006.01)
(Continued)

(52) U.S. Cl.
CPC ..... *G02B 27/0172* (2013.01); *G02B 26/0808* (2013.01); *G02C 9/00* (2013.01); *G03B 21/10* (2013.01); *G03H 1/0248* (2013.01); *G06F 1/163* (2013.01); *G06F 3/013* (2013.01); *H04N 7/183* (2013.01); *G02B 5/1828* (2013.01); *G02B 27/0093* (2013.01); *G02B 27/0103* (2013.01); *G02B 2027/011* (2013.01); (Continued)

(58) Field of Classification Search
None
See application file for complete search history.

(56) References Cited

U.S. PATENT DOCUMENTS 8,477,425 B2    7/2013  Border et al.
2004/0108971 A1  6/2004  Waldern et al.
(Continued)

FOREIGN PATENT DOCUMENTS

WO    9821612       5/1998
WO    0172037 A1    9/2001
(Continued)

OTHER PUBLICATIONS

Brian Guenter et al., "Foveated 3D Graphics", Microsoft Research, Nov. 20, 2012, 10 pages, http://research.microsoft.com/apps/pubs/default.aspx?id=176610, ACM SIGGRAPH Asia.
(Continued)

*Primary Examiner* — Joseph Haley
*Assistant Examiner* — Emily Frank
(74) *Attorney, Agent, or Firm* — Lempia Summerfield Katz LLC

(57) ABSTRACT

A display includes a projector configured to provide light of a virtual image, a waveguide into which the light of the virtual image is injected at an injection angle by the projector, and a combiner disposed along the waveguide and configured to redirect the light of the virtual image. The waveguide is configured to emit the light at a point established by the injection angle. The combiner is further configured to allow ambient light from beyond the waveguide to pass through the combiner. The waveguide constrains the light of the virtual image through total internal reflection along a curved path for the light between the projector and the combiner.

21 Claims, 4 Drawing Sheets

(51) Int. Cl.
*G02B 27/00* (2006.01)
*G02B 5/18* (2006.01)
*G02C 9/00* (2006.01)
*G03B 21/10* (2006.01)
*G03H 1/02* (2006.01)
*G06F 1/16* (2006.01)
*G06F 3/01* (2006.01)
*H04N 7/18* (2006.01)

(52) U.S. Cl.
CPC ........... *G02B 2027/013* (2013.01); *G02B 2027/0105* (2013.01); *G02B 2027/0123* (2013.01); *G02B 2027/0174* (2013.01); *G02B 2027/0178* (2013.01); *G02B 2027/0187* (2013.01); *G02B 2027/0194* (2013.01)

(56) References Cited

U.S. PATENT DOCUMENTS

| | | | |
|---|---|---|---|
| 2010/0149073 A1* | 6/2010 | Chaum | G02B 27/0093 345/8 |
| 2012/0013988 A1 | 1/2012 | Hutchin | |
| 2012/0062850 A1 | 3/2012 | Travis | |
| 2012/0105310 A1* | 5/2012 | Sverdrup | G02B 27/017 345/8 |
| 2013/0050186 A1 | 2/2013 | Large et al. | |
| 2013/0051730 A1* | 2/2013 | Travers | G02B 27/01 385/37 |
| 2013/0201094 A1 | 8/2013 | Travis et al. | |
| 2013/0222384 A1* | 8/2013 | Futterer | G02B 5/32 345/426 |
| 2013/0329301 A1 | 12/2013 | Travis | |
| 2014/0033052 A1 | 1/2014 | Kaufman et al. | |
| 2014/0063054 A1* | 3/2014 | Osterhout | G06F 3/005 345/633 |
| 2014/0146394 A1 | 5/2014 | Tout et al. | |
| 2017/0078652 A1* | 3/2017 | Hua | G02B 17/086 |

FOREIGN PATENT DOCUMENTS

| | | |
|---|---|---|
| WO | 03013151 A2 | 2/2003 |
| WO | 2008046057 A2 | 4/2008 |
| WO | 2012088478 A1 | 6/2012 |
| WO | 2013028687 A2 | 2/2013 |
| WO | 2014085734 A1 | 6/2014 |

OTHER PUBLICATIONS

Kayvan Mirza et al., "Key Challenges to Affordable See Through Wearable Displays: The Missing Link for Mobile AR Mass Deployment", In Proceedings of Photonic Applications for Aerospace, Commercial, and Harsh Environments, May 2013, 8 pages.

"International Search Report & Written Opinion Issued in PCT Application No. PCT/US2015/068208", Mailed Date: May 17, 2016, 13 Pages.

"Written Opinion of the International Preliminary Examining Authority" issued in PCT Application No. PCT/US2015/068208, dated Dec. 14, 2016, 4 Pages.

"International Preliminary Report on Patentability Issued in PCT Application No. PCT/US2015/068208", dated: Mar. 22, 2017, 7 Pages.

\* cited by examiner

VIRTUAL IMAGE DISPLAY WITH CURVED LIGHT PATH

DESCRIPTION OF THE DRAWING FIGURES

For a more complete understanding of the disclosure, reference is made to the following detailed description and accompanying drawing figures, in which like reference numerals may be used to identify like elements.

Figure 1:
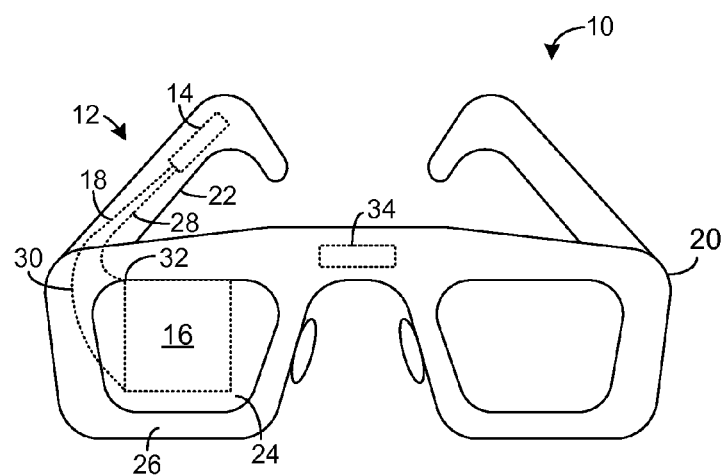
FIG. 1 is a schematic, perspective view of a wearable electronic device having a virtual image display with a curved light path in accordance with one example.

While the disclosed devices are susceptible of embodiments in various forms, specific embodiments are illustrated in the drawing (and are hereafter described), with the understanding that the disclosure is intended to be illustrative, and is not intended to limit the invention to the specific embodiments described and illustrated herein.

DETAILED DESCRIPTION

Wearable electronic devices include a display that produces a virtual image. Virtual images may be useful because the human eye has trouble focusing at short distances (e.g., less than a few centimeters). Electronic devices are described that provide virtual images, despite being sized and configured as near-eye or other wearable electronic devices, such as eyeglasses or other head-mounted display devices.

The electronic devices may have a display with a curved waveguide. The curved waveguide may allow the display of the electronic devices to be compact. For instance, the curved light path may be useful in head-mounted devices, inasmuch the electronic device may be sized and shaped to conform to a user's head as a result. In eyeglass examples, the curved and other sections of the waveguide may also allow a projector to be spaced from the location of the virtual image, such as along a temple of the eyeglass frame. The waveguide may be useful in carrying the light rays from a projector offset from the virtual image location in two lateral directions (e.g., laterally outward and rearward).

The electronic devices address field of view and other challenges arising from the production of virtual images, the use of the curved waveguide, and other aspects of the display. The production of virtual images may lead to a narrow field of view. A virtual image is observed if a display is placed in the rear focal plane of a lens and one looks through the lens. In that case, the image appears infinitely distant. If the display is moved slightly farther from the lens, the virtual image appears to be positioned less far away, allowing the accommodation of the eye to alter. The field of view of the virtual image in such cases is a function of the size of the display. The electronic devices provide a suitable field of view without resorting to increasing the size of the display or projector. Moreover, a suitable field of view may be provided by the electronic devices despite further constraint resulting from the folding of the optical path within the curved light path. A suitable field of view may thus be provided while avoiding a bulky design.

The compact design and the curved nature of the light path may allow the electronic devices to be curved around the head of the user. Curving the electronic device around the user's head may, in turn, be useful for supporting extreme fields of view. For example, the curvature may be useful in creating virtual images at extreme angles (e.g., at or about 90 degrees to the viewer's line of sight) that a flat element arranged perpendicularly to the viewer's line of sight may be incapable of providing without being significantly larger.

In some cases, the electronic devices are configured as see-through displays in which the virtual image is superimposed on the image of the outside world. The electronic devices include a combiner to allow the user to see the outside world in addition to the virtual image. Observing the outside world beyond the virtual image may be useful, for instance, in connection with eyeglasses and other devices worn on the head. To provide a combiner, the lens used to produce the virtual image may be replaced by a mirror with optical curvature or a volume grating. The volume grating or other combiner of the electronic devices is partially transparent to allow light from the outside world to pass through. For example, the volume grating may be transparent at wavelengths except those provided by the display, which the grating reflects. Additional or alternative layers or other components of the display may be partially or fully transparent.

The electronic devices use a projector (e.g., a video projector) as the display for the virtual image. The curved light path provided by the waveguide and other optical components of the electronic devices may be configured such that the rays generated by the projector come to a focus where the display would otherwise be. Viewer accommodation may then be altered by refocusing the lens of the projector.

Other components of the electronic devices address challenges arising from the use of a projector to produce a virtual image. The position of the projector determines where the rays concentrate after hitting the combiner. A wide field of view may be attained by concentrating all rays into the pupil. However, it is challenging to design a projector lens that focuses properly over a wide field of view. Furthermore, as soon as the pupil moves, the image is lost. The electronic devices address such field of view and other challenges either by generating separate visual images for the foveal vision and peripheral vision (e.g., via separate display systems) or by generating a wider field of view through scanning (e.g., with a stack of switchable gratings).

Various types of scanning techniques may be used to sequentially generate the portions of the image for both the foveal vision and the peripheral vision. In switchable grating examples, the display may concentrate the rays at the pupil, and then use the switchable gratings between the waveguide and the eye to direct the rays to the position of the pupil. However, no switchable grating is entirely efficient. Some viewers may find unacceptable the faint double image formed by un-diffracted light, e.g., at night or other low light conditions.

To avoid these issues of switchable gratings, other examples of the electronic devices include separate display systems (or subsystems) for foveal vision and peripheral vision. The foveal vision system may be configured such that rays of the central portion of the virtual image are generated by the projector and concentrated on the center of the orbit, or fovea. As a result, the central vision continually sees the projected image (e.g., a high resolution image generated by the projector). The foveal vision system may use a holographic projector. The peripheral vision system (or subsystem) is configured to display a virtual image with a wide field of view at a low (or lower) resolution, which is acceptable to peripheral vision. The peripheral vision system may rely on a liquid crystal display (LCD) and structured illumination. For example, the peripheral vision system may include an LCD panel illuminated by rays of light that concentrate through the center of the pupil. Combining the two systems may thus address the narrow field of view of the foveal vision without resorting to making the projector impractically large.

The curved waveguide, projector-based scanning or foveal/peripheral subsystems, and other aspects of the displays may provide the virtual images at a suitable resolution and with acceptable field of view. For example, the field of view may be about 120 degrees by about 90 degrees. The virtual images may be displayed at a resolution suitable for a human computer interface, such as about 2000 pixels per radian or more. Such resolution and field of view levels may be attained by electronic devices that are slim and compact, despite using a combiner and a projector to produce the virtual images.

Even if switchable gratings or other scanning techniques are suitably efficient and/or effective, the electronic devices may nonetheless be configured to produce a high resolution image to the fovea and a low resolution image to peripheral vision. Separate images may be useful because the size of the liquid crystal panel for each task may be reduced. Moreover, the power consumed in computing holograms for a holographic projector may also be reduced.

The electronic devices have a number of operational aspects in addition to achieving acceptable field of view and resolution in a compact, form-fitting, non-bulky form. For example, the virtual images may be provided by the electronic devices with minimal use of power. Power use may be reduced through the lack of wasted light. The power consumed by the electronic device may be low despite using a projection-based virtual image. The virtual image may also be provided with variable focal depth, despite involving waveguide embossed with gratings in some cases.

Although described below in connection with near-eye or head-mounted devices, the internal support may be used in connection with a wide variety of electronic devices and displays. The size and form factor of the electronic device may vary considerably. The display of the device may range from other wearable devices (e.g., a wristwatch) to large-scale heads-up displays for various applications.

FIG. 1 shows an electronic device 10 having a display system 12. The display system 12 generates virtual images for viewing by a wearer of the electronic device 10. The virtual images are projected in front of the wearer's eyes. To that end, the electronic device 10 is configured to be worn as eyeglasses or other eyewear. In this example, the display system 12 is disposed on one side of the eyewear for a single eye. The display system 12 may be replicated for the other side, such that virtual images are generated for both eyes. In some cases, the same virtual image is generated for each eye. In other cases (e.g., stereoscopic imaging), the virtual images may differ. One or more components of the display system 12 may be shared by the two sides of the electronic device 10.

The display system 12 includes a projector 14, a combiner 16, and a waveguide 18 optically coupling the projector 14 and the combiner 16. Each of the projector 14, the combiner 16, and the waveguide 18 may be mounted on, incorporated within, or otherwise carried by an eyeglass frame 20 of the electronic device 10. In this example, the projector 14 is disposed within or on a temple 22 of the frame 20. The waveguide 18 may extend along and/or within the temple 22 to reach the combiner 16. The combiner 16 is disposed within a viewing area 24 defined by a rim 26 of the frame 20.

The projector 14 is configured to provide light of a virtual image. For example, the projector 14 may include one or more liquid crystal panels to produce the light of the virtual image. In this example, the projector 14 is mounted on a component of a frame 20 of the eyeglasses. The light of the virtual image is injected into the waveguide 18 at an injection angle by the projector 14. The injection angle is determinative of the point or position at which the light is extracted or emitted from the waveguide 18.

In some cases, the projector 14 may be used to produce light for both foveal or peripheral vision. For example, images for both the foveal and peripheral vision may be provided through scanning (e.g., switchable gratings). One or more components or aspects of the projector 14 may be controlled to support such scanning.

In other cases (e.g., separate display system cases), the projector 14 may be used to support only the foveal vision. The display system 12 may accordingly include multiple projectors (e.g., one for foveal vision and one for peripheral vision). The projectors may be mounted or otherwise disposed at different locations on or within the frame 20. For example, the projector 14 may be disposed at a distal end of the temple 22, while another projector may be disposed at a proximate end of the temple 22 (e.g., near the rim 26). The other projector may be used to provide light for a backlight unit of the peripheral vision system.

The waveguide 18 constrains the light of the virtual image as the light travels through total internal reflection (TIR) from the projector 14 to reach the combiner 16. The waveguide 18 thus folds up the optical path between the projector 14 and the combiner 16. The waveguide 18 may include multiple sections to extend beyond the temple 22 and deliver the light to the combiner 16 and the viewing area 24. The light of the virtual image travels along a curved path between the projector 14 and the combiner 16. In the example of FIG. 1, the waveguide 18 includes a section 28 extending the length of the temple 22, a curved section 30 near where the rim 26 is coupled to the temple 22, and an extraction section 32 coextensive with the combiner 16. The section 30 is disposed between the sections 28, 32, and defines the curved path. Another example of the waveguide 18 and the respective sections 28, 30, 32 is shown and described in connection with FIG. 2. Examples of the extraction section 32 are shown and described in connection with the examples of FIGS. 3, 4, and 6.

The curved path is configured to redirect the light of the virtual image. The curved nature of the waveguide 18 allows the projector 14 to be spaced from the viewing area 24. In this example, the projector 14 is spaced both laterally outward and rearward from the viewing area 24. The electronic device 10 may thus avoid bulky components disposed at or near the rim 26.

The waveguide 18 may be composed of a variety of materials. In some cases, the waveguide 18 includes or is made of acrylic/PMMA (polymethyl methacrylate) or polycarbonate materials. Additional or alternative materials may be used, such as Trivex or higher refractive index polymers.

The combiner 16 is further configured to allow external or other ambient light from beyond the waveguide 18 to pass through the combiner 16. The combiner 16 may thus be partially transparent to allow light of the outside world to reach the viewer for superimposition on the virtual image. In some examples, the combiner 16 includes a volume grating transparent (or substantially transparent) at all wavelengths except those from the projector 14 which is/are reflected (or substantially reflected) by the combiner 16 toward the viewer. The pitch of the volume grating may vary as a function of position to direct the light toward the viewer. Another example of a suitable combiner is described and shown in connection with FIG. 6.

Once the light reaches the combiner 16, the light is emitted from the waveguide 18 for redirection by the combiner 16 toward the viewer. As described herein, the emission or extraction of the light from the waveguide 18 may result from tapering of the waveguide or interaction with a number of volume holograms embedded in the waveguide 18. In either case, the waveguide 18 is configured to emit the light at a point (e.g., position along the waveguide 18) established by the injection angle.

The display system 12 may be integrated with the eyeglass frame 20 or other structural components of the electronic device 10 in various ways. One or more elements of the display system 12 may be externally mounted on the structural component(s). Alternatively or additionally, one or more elements are internal or otherwise disposed within or integrated with the structural components. For example, the section 28 of the waveguide 18 may be disposed within the eyeglass frame 20, while the other sections 30, 32 may be external to the eyeglass frame 20.

A number of electronic control components of the electronic device 10 are schematically shown at 34 in FIG. 1 for ease in illustration. Many of the control components may be arranged in a control module. However, the location(s) of the control module (and/or any other components) may vary considerably from the example shown. The control components 34 may be directed to processing, storage, data capture (e.g., camera), and power (e.g., battery power). Further details regarding the control components 34 are described and shown in connection with FIG. 7.

The manner in which the electronic device 10 is wearable may vary. Other types of wearable mounts may be used to position the virtual image a short distance in front of the wearer's eyes. For example, the electronic device 10 may include a helmet with a display visor. In these and other cases, the electronic device 10 may include one or more lenses, filters, and/or other optical elements disposed in or near the viewing area. The lenses or other elements may be configured to correct the focus and/or other aspects of the projected images for the comfort and vision needs of the wearer.

Figure 2:
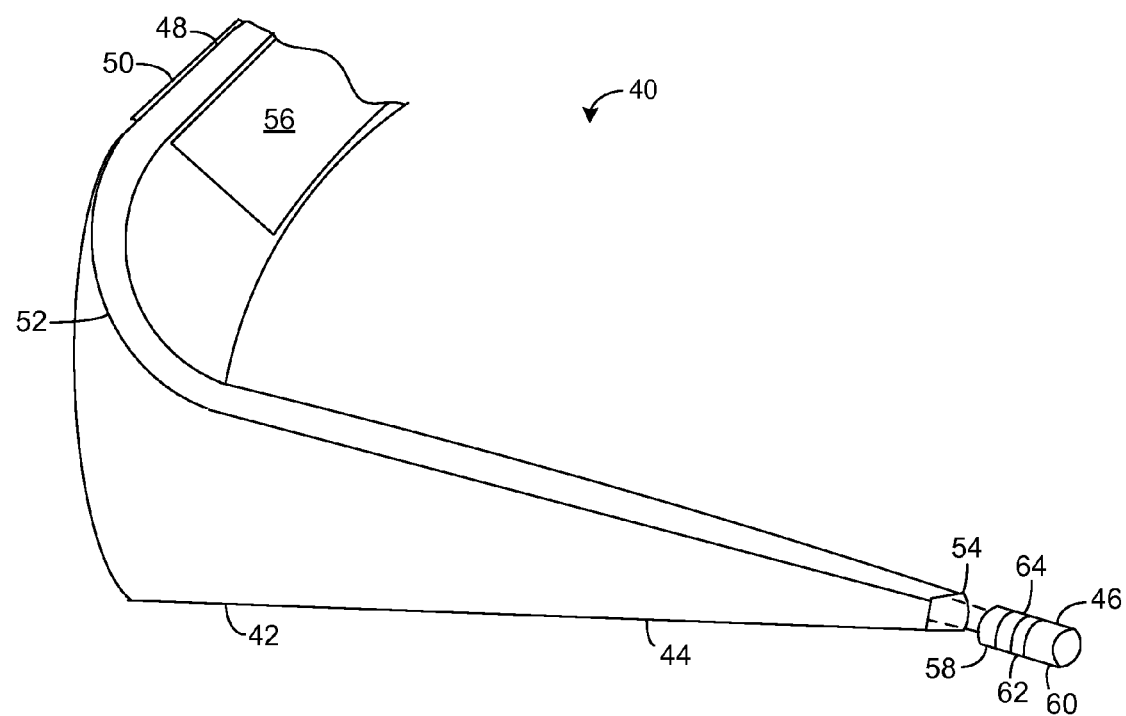
FIG. 2 is a partial, schematic, perspective view of a wearable electronic device having a virtual image display with a curved light path in accordance with one example.

FIG. 2 depicts another example of a display 40 for a wearable electronic device 40. As in the above-described examples, the display 40 has a curved waveguide 42. In this example, the electronic device 40 may be configured as a visor or other head-mounted device. The waveguide 42 may include or be composed of acrylic/PMMA, polycarbonate, and/or other materials.

The waveguide 42 includes a section 44 extending from a projector 46, a section 48 disposed along a combiner 50, and a curved section 52 between the other sections 44, 48. In some cases, the sections 44, 48, 52 of the waveguide 42 may form the structural components of the visor itself. For example, the section 44 may form, or correspond with, a side of the visor that extends along the temple of the viewer. Alternatively, the section 44 may be mounted on, extend along, or be otherwise integrated with another component of the display 40 (or electronic device) that acts as the visor side. The curved section 52 may be shaped and sized such that the display 40 wraps around the head of the viewer. The section 48 may form, or correspond with, a front face that defines the viewing area of the display 40, extending across the eye(s) of the viewer. Alternatively, the section 48 may be mounted on, extend along, or otherwise integrated with another component of the display 40 (or electronic device) that acts as the front face of the visor, such as a transparent shield.

One or more of the sections 44, 48, 52 may fan out as the distance from the projector 46 increases. In the example of FIG. 2, the section 44 progressively fans out from an end 54 into which the light is injected. The end 54 may have a face sized to match an output face of the projector 46. Alternatively, the end 54 may be larger than the projector 46. In either case, the height dimension of the section 44 may increase with increasing distance from the end 54. As the height dimension increases, the light may disperse as the light propagates through the waveguide 42 from the end 54. Any aberrations arising from such dispersion and/or from the curvature of the waveguide 42 may be addressed through holograms produced by the projector 46. The hologram may pre-distort a wave front of the projected light so that, after aberration, the wave front becomes well behaved.

In the example of FIG. 2, the waveguide section 48 along the combiner 50 is tapered. An exemplary waveguide taper is better depicted in the examples of FIGS. 3 and 4. The taper forms a wedge waveguide that causes the light propagating through the waveguide 42 to eventually exceed the TIR critical angle after a certain number of reflections. The number of reflections depends on the angle at which the light is injected into the waveguide 42. Once the critical angle is exceeded, the light exits the waveguide 42 and reflects off of the combiner 50 for redirection toward the viewer. In other cases, the waveguide section 48 is not tapered. Instead, the light may be extracted using volume holograms embedded in the waveguide 42. In such cases, the volume holograms may also act as the combiner 50, as described and shown in connection with the example of FIG. 6.

The display of the electronic device 40 may include one or more components in front of the waveguide section 48. In this case, the component(s) are schematically depicted as a single layer 56, but any number of layers may be included. In some cases, the layer 56 is representative of a number of switchable gratings stacked in front of the waveguide section 48 to direct the image to the location of the pupil. In other cases, the layer 56 is representative of a liquid crystal display (LCD) system used to produce virtual images for the peripheral vision. The LCD system may include a number of films or layers, including, for instance, a multi-layer LCD panel and one or more polarization filters. Further details regarding these display components are provided in connection with the examples of FIGS. 3-5.

The projector 46 may be a holographic projector. The projector 46 may include a number of liquid crystal panels to produce holographic images. In some examples, the liquid crystal panel(s) may be configured to display holographic images operative as one or more diffraction gratings. For ease in illustration, the projector 46 is depicted with a single liquid crystal panel 58 for such diffraction. A laser beam 60 or other light source illuminates the liquid crystal panel 58. Additional liquid crystal panels may be provided for diffraction. The liquid crystal grating(s) diffract light to where the light is desired, rather than blocking light from where the light is not desired (as in, for instance, video projectors that place a liquid crystal panel in the focal plane of a projection lens). The projector 46 may thus waste less light than non-holographic projectors. Nonetheless, in other cases, a non-holographic video projector may be used. For example, a scanned beam projector may be used instead, as, for instance, described in connection with other examples addressed herein.

The holograms produced by the projector 46 may also be operative as a lens. The projector 46 may display the hologram of a lens to alter the distance to where the rays of the virtual image focus. The holographic lens may alternatively or additionally be used to correct for aberrations introduced during propagation through the waveguide 42, including aberrations from the curved section 52, the wedge-shaped section 48, or other aspects of the waveguide 42.

The fan-out angle of holographic projectors may be narrow for the overall desired field of view. However, the fan-out angle is not problematic if the projector 46 is used only for the central or foveal vision (and a separate LCD system is used to address the peripheral vision). In scanned beam cases, the scanner may be driven with, e.g., DC bias or other control signals, for writing an image to the area seen by the fovea. Addressing only the foveal vision may also limit power consumption to acceptable levels. While the calculation of holograms may generally involve a large amount of power, the central vision may be addressed via only a small hologram.

In the example of FIG. 2, the holographic projector 46 includes a number of additional components to move the projected image in accordance with the position of the fovea. The projected image may accordingly remain visible to the viewer as the eye moves to a new position. In this case, the additional components move the projected image about the surface of the waveguide 42 without moving parts. However, in other cases, one or more moving parts, such as a mirror, may be used. One way to move the projected image is to alter the angle at which the liquid crystal panel 58 is illuminated. For example, a liquid crystal grating 62 may be disposed between the liquid crystal panel 58 and the light source 60 to alter the angle. In this example, a telescope 64 is also used to magnify the scanning angle from the liquid crystal grating 62.

The configuration of the waveguides may differ from the examples shown and described in connection with FIGS. 1 and 2. For example, the waveguide may be or include a curve of uniform radius of curvature. The extent of the curve may vary. In some cases, one end of the curve may be disposed at or near the projector, while an opposite end of the curve may be disposed at or near the nose of the viewer. In such cases, one or more other components of the display system may also be curved, such as an LCD panel.

Figure 3:
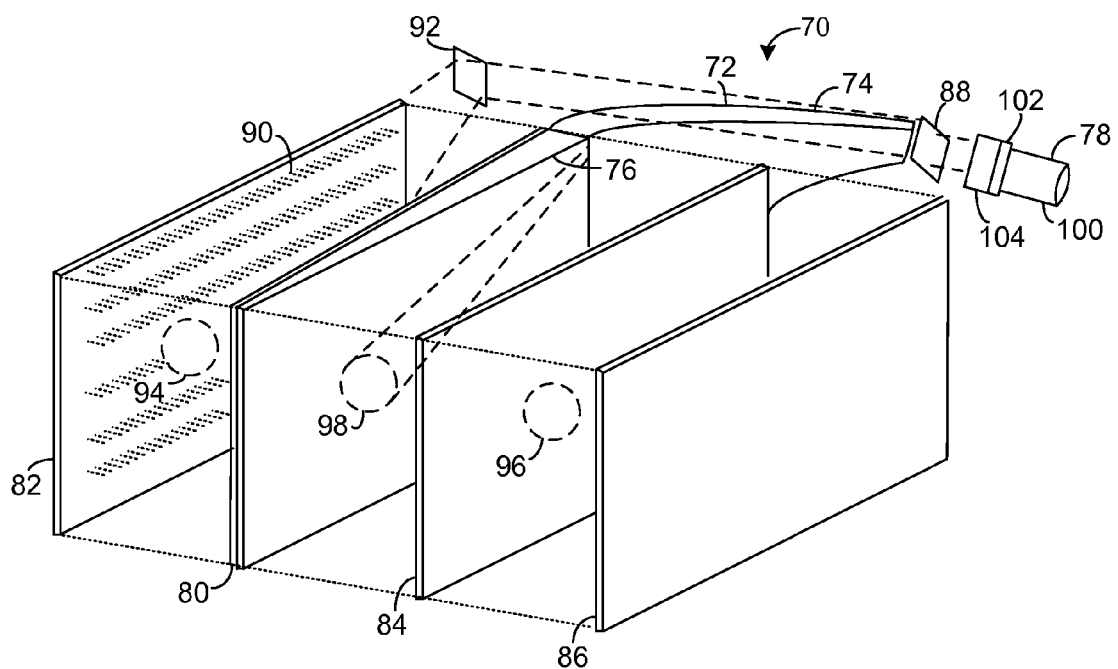
FIG. 3 is an exploded, schematic, perspective view of the virtual image display of the wearable electronic device of FIG. 2 in accordance with one example.

FIG. 3 depicts another display system 70 in which light for virtual images is delivered via a curved waveguide 72. Only a portion of the curved waveguide 72 may be shown for ease in illustration of the curved path and other optical components of the display system 70. In this example, the waveguide 72 includes a curved section 74 and a wedge waveguide section 76. The wedge waveguide section 76 is tapered to emit the light after a number of reflections within the wedge waveguide section 76 in accordance with the angle at which the light is injected into the waveguide 72.

The display system 70 is one example of a display that includes a subsystem for the foveal vision and a subsystem for the peripheral vision. The imagery produced by the peripheral vision subsystem may have a lower resolution than the virtual image provided by the light from the waveguide 72. The higher resolution of the virtual image may be appropriate for viewing by the fovea. The lower resolution of the peripheral imagery may be acceptable for the peripheral vision of the viewer.

The foveal vision subsystem includes the waveguide 72, a projector 78, and a combiner 80. The peripheral vision subsystem includes a backlight panel 82, an LCD panel 84, and a polarizer 86. In this example, the subsystem components are arranged with the backlight unit 82 in the rearmost position, followed by, in order from back to front, the combiner 80, the wedge waveguide section 76, the LCD panel 84, and the polarizer 86. The backlight panel 82 is behind the LCD panel 84 to illuminate the LCD panel 84, and the polarizer 86 is positioned in front of the LCD panel 84 to create the LCD image. The relative positions of the other components may vary from the example shown. For example, the wedge waveguide section 76 and the combiner 80 may be positioned behind the backlight panel 82.

In the example of FIG. 3, a single projector is used for both subsystems. The projector 78 produces the light rays of the virtual image for the foveal vision, as well as the light rays for the illumination provided by the backlight panel 82. In other cases, multiple projectors or other light sources may be used. For example, one or more light emitting diode (LED) or other light emitting devices may be disposed along an edge of the backlight panel 82 to act as the respective light source for the peripheral vision subsystem.

Some of the subsystem components are depicted in exploded form for ease in illustration. In some cases, the subsystem components are stacked contiguously. Alternatively, some or all of the subsystem components are spaced from adjacent components by a passive film or other spacer. In still other cases, some or all of the subsystem components are separated by an air gap. The subsystem components may be mounted in a frame or other structure, such as the rim of an eyeglass frame.

In the foveal subsystem, the projector 78 injects the light into the waveguide 72 at an injection angle that determines the point at which the light is emitted from the wedge waveguide section 76 for interaction with the combiner 80. In this example, the light is injected into the waveguide 72 after reflecting off of a mirror 88 (e.g., a 45 degree mirror). The mirror 88 may be partially transparent to select the light to be used for the foveal vision subsystem. In some cases, the mirror 88 may be used to establish the injection angle. For example, the mirror 88 may be rotatable or otherwise moveable. After reflecting off the mirror, the light travels through the curved section 74 of the waveguide 72 between the projector 78 and the combiner 80. The mirror 88 may include additional optical elements (e.g., a lens) to capture and/or direct the light at the desired injection angle.

Light generated by the projector 78 may also be used by the peripheral vision subsystem. In the example of FIG. 3, the light not reflected by the mirror 88 does not enter the waveguide 72. Instead, the light travels to the backlight panel 82. The light may be guided by a separate waveguide. The light is shown traveling through free space in FIG. 3 for ease in illustration. Alternatively, the light for both the peripheral and foveal vision subsystems propagates via the same waveguide 72 in a time-multiplexed manner.

In this example, the combiner 80 includes a partially transparent film or other layer disposed on a rear face of the wedge waveguide section 76. The partial transparency allows light from beyond the display 70 to pass through and reach the viewer. The light emitted from the wedge waveguide section 76 is reflected for redirection toward the viewer. In some cases, the transparency of the combiner 80 is dependent upon on the wavelength of the light. For example, the combiner 80 may include a volume grating having wavelength-dependent reflectivity. In other cases, the combiner 80 includes a set of volume holograms embedded in the waveguide 76. The volume holograms may also be used for light extraction, in which case the waveguide 76 may not be wedge-shaped in the viewing area.

Turning to the peripheral vision subsystem, the backlight panel 82 may be configured to generate converging rays of light for illumination of the LCD panel 84. After the converging rays illuminate the LCD panel 84, the rays may act as if passing through a pinhole placed in front of a display to project an image of the display that is in focus at any distance. The same effect is achieved by illuminating the LCD panel 84 with rays that concentrate to a point where the pinhole would otherwise be. In this case, the point corresponds with the pupil of the viewer. Consequently, an image forms on the retina that appears virtual because of the large depth of field.

The backlight panel 82 may also be configured such that the point at which the rays concentrate moves to match the current position of the eye. As the pupil moves, the position to which rays concentrate also moves to allow the viewer to still see the virtual image. To move the position, the backlight panel 82 may include an array 90 of volume or multiply recorded holograms. Each volume hologram is configured to direct the rays to a respective one of the possible pupil positions upon excitation.

The possible pupil positions may be determined as follows. The pupil has a minimum diameter of about 2 millimeters. At that size, the pupil can move to a discrete number of independent (i.e., not overlapping) positions. In some cases, there are about 37 independent positions. The positions may be distributed over an area (e.g., a hexagonal area) with about seven pixels across the area. Thus, in one example, about 37 volume holograms are recorded in the backlight panel 82, one volume hologram for each pupil position.

Each volume hologram diffracts if illuminated at the angle at which the volume hologram was recorded. Each volume hologram is recorded at a respective (i.e., different) angle. Thus, providing light to the backlight panel 82 at a certain angle selects a respective one of the volume holograms for excitation. The angle at which the light is incident upon the backlight panel 82 may be determined in various ways. In the example of FIG. 3, the incidence angle is determined by a rotatable mirror 92. Light from the projector 78 that does not enter the waveguide 72 of the foveal vision subsystem is redirected by the rotatable mirror 92 toward the backlight panel 82 as shown.

The light may be directed or redirected toward the backlight panel 82 at a desired incidence angle in other ways, including, for instance, via another panel having a set of volume holograms. The backlight panel 82 may be considered a component of a backlight unit that includes the additional panel, the rotatable mirror 92, and/or other components used to illuminate the LCD panel 84. The backlight unit may be controlled by a pupil tracking module configured to track or otherwise determine the position of the pupil. The pupil tracking module may receive data indicative of image data captured by a camera, as described in connection with the example of FIG. 7.

The polarizer 86 filters the light to produce the peripheral imagery. The LCD panel 84 changes the polarization of the light provided by the backlight panel 82 on a pixel-by-pixel basis. In one example, the polarizer 86 is a linear polarizer with a transmission axis oriented in, e.g., the vertical direction. The LCD panel 84 is thus controlled to produce vertically polarized light for each pixel in the "ON" state, and to produce horizontally polarized light for each pixel in the "OFF" state. The light produced by the foveal vision subsystem may also be vertically polarized to avoid being blocked by the polarizer 86. While the ambient light from the outside world may not be vertically polarized, enough of the ambient light is non-polarized to allow the viewer to see beyond the display 70.

In the example of FIG. 3, the light provided by the backlight panel 82 does not entirely cover the viewing area. A region 94 of the backlight panel 82 does not provide light to the LCD panel 84, thereby resulting in a non-illuminated region 96 of the LCD panel 84. The region 96 is non-illuminated in the sense that the backlight panel 82 does not illuminate the region 96.

The non-illumination of the LCD panel 84 avoids conflict with the light of the foveal imagery. The regions 94 and 96 correspond with an area 98 in which the foveal image is produced. The positioning of the area 98 is determined by the injection angle, as described above.

The LCD panel 84 may also be controlled such that the pixels are inactive in the region 96 of the LCD panel 84. Deactivation of the pixels leads to light emitted from the wedge waveguide section 76 passing through the LCD panel 84 without polarization modification by the liquid crystals. By not illuminating the LCD panel 84 in the region 94, and by deactivating the pixels in the region 94, the peripheral imagery is limited to the periphery of the viewing area. The positioning of the regions 94 and 96 is adjusted in accordance with the positioning of the area 98. In other cases, the LCD panel 84 is controlled to modify the polarization of the light of the foveal imagery passing through the region 96, so that the light matches the transmission axis of the polarizer 86, and the foveal imagery is viewable.

The peripheral vision subsystem may use time multiplexing (rather than color filters) to provide color imagery. The lack of color filters may be useful in allowing light from the outside world to reach the viewer. Time multiplexing may be achieved because the LCD panel 84 may have a coarse resolution appropriate for peripheral vision. For example, the resolution may correspond with pixels having a size of about 100 microns, which leads to only about 300 horizontal lines. The lower resolution may also be useful because the LCD panel 84 has a low (or sparse) transistor density. Consequently, less light from beyond the LCD panel 84 is blocked by the transistors of the LCD panel 84.

The projector 78 may include one or more lasers or other light sources. The projector 78 may be a holographic projector, as described above. In the example of FIG. 3, the projector 78 includes a single laser 100 to provide light for both the foveal and peripheral vision subsystems. The projector 78 may also include one or more liquid crystal layers, as described above. In this example, the projector 78 includes a liquid crystal grating 102 and a liquid crystal display 104. The liquid crystal display 104 may include or be configured as a liquid crystal on silicon (LCoS) device.

Figure 4:
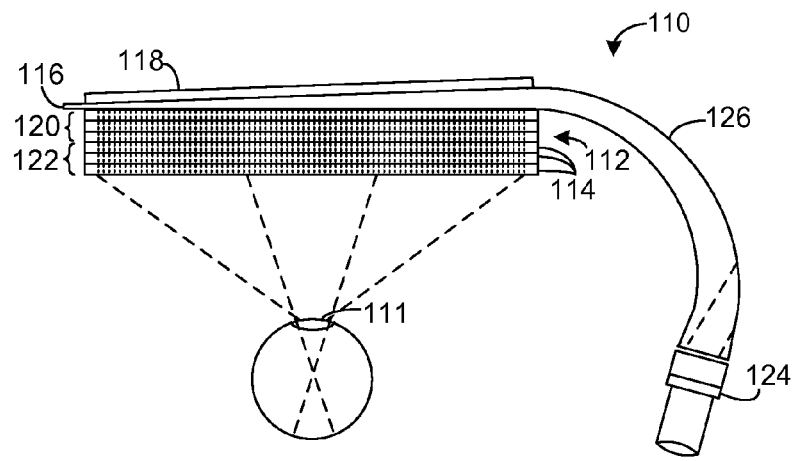
FIG. 4 is a schematic, plan view of the virtual image display of the wearable electronic device of FIG. 2 in accordance with one example.

FIG. 4 depicts an exemplary display 110 in which both the foveal and peripheral portions of the virtual image are produced through scanning. Scanning is used rather than handling the peripheral imagery separately by a separate display system or subsystem. Scanning allows a wide field of view to be attained, despite the narrow field of view produced by a projection-based system with guided rays. The scanning allows the light to be concentrated at a pupil 111 of the viewer, even if the position of the pupil changes. In cases using scanning, the display 110 may attain a wide field of view by producing an image for both the foveal and peripheral vision, and for all of the possible positions of the pupil.

The display 110 includes a scanner 112 configured to concentrate the light at a plurality of possible pupil positions. The scanner 112 sequentially directs the light to each possible pupil position of the plurality of possible pupil positions. In the example of FIG. 4, the scanner 112 includes a stack of switchable gratings 114 disposed adjacent a wedge waveguide 116. The stack of switchable gratings 114 may be disposed at any position between the pupil of the viewer and a combiner 118. In operation, the light emitted from the wedge waveguide 116 is redirected by the combiner 118 and then steered to one of the possible pupil positions by one or more of the gratings 114. Each grating 114 may be individually controlled for selective activation by a respective control signal provided by a grating controller or other controller, such as a grating control module implemented by a processor, an example of which is described below in connection with FIG. 7.

The amount and direction of steering (or deflection) introduced by each grating 114 in the stack may vary. For example, a subset 120 of the gratings 114 may be configured to steer in the vertical direction, while a subset 122 may be configured to steer in the horizontal direction. In the example of FIG. 4, a total of six gratings 114 are provided, with three of the gratings 114 in each subset 120, 122. The amount of steering provided by each grating 114 may vary to cover all of the entire range of pupil positions and at the granularity. For example, one of the vertical gratings 114 in the subset 120 may switch through 1 degree of vertical steering, while the other two vertical gratings 114 switch through 2 degrees and 4 degrees. The horizontal gratings 114 in the subset 122 may be configured in a similar manner.

By activating various combinations of the vertical gratings 114, the scanner 112 may cover a range of possible positions of the pupil 111. At its smallest, the pupil 111 has a diameter of about 2 millimeters. At that size, the pupil may reside at one of seven positions without overlap in the horizontal direction, and at one of seven positions without overlap in the vertical positions. Thus, in one example, the discrete number of possible pupil position offsets in each direction (vertical and horizontal) is seven. With seven possibilities, three switchable gratings 114 in each subset 120, 122 are enough to cover each discrete position. For example, if each discrete position corresponds with 1 degree of deflection, the range of position offsets is 0-7 degrees. That range may be covered with the three gratings in each subset 120, 122, because the maximum deflection may be reached by activating all three gratings (i.e., 1+2+4 degrees with each grating activated), and each individual offset in between (1-6 degrees) may be covered by respective combinations of less than all three gratings (e.g., 4 degrees=1 degree+3 degrees). The number of degrees presented by each offset may differ in other cases, but three gratings 114 in each subset 120, 122 may address each possible offset if the ratio of the deflection provided by the gratings 114 are 1:2:4, as described above.

The display 110 may include a projector 124 and curved waveguide section 126 to provide the rays of the virtual image to the combiner 118. As in the examples described above, the rays are emitted from the waveguide 126 in a direction away from the eye of the viewer, and then reflected back by the combiner 118 toward the eye. The projector 124 and the curved waveguide section 126 may be configured as described above. For instance, the projector 124 may be configured to inject the rays into the curved waveguide section 126 (or other section of the waveguide) at an angle determinative of the position at which the light is emitted from the wedge waveguide 116. Other examples may use other techniques to extract the light from the waveguide at a position determined by the injection angle, including, for example, embedded volume holograms.

Each switchable grating 114 may be a liquid crystal diffraction grating. Each switchable grating 114 may be formed by recording an interference pattern with ultraviolet light in a mixture of liquid crystal and photopolymer. For example, the layers of liquid crystal may diffract a high percentage (e.g., 99%) of p-polarized light in the presence of electromagnetic field and do not diffract in its absence. In this case, the switchable gratings 114 are configured to deflect light from the projector 124, but not the ambient light. However, s-polarized light is not diffracted by the layers of liquid crystal in either state. Consequently, the display 110 may include a polarizer (e.g., behind the combiner 118) to establish that the ambient light is s-polarized.

The liquid crystal grating may be disposed in a respective film or layer as shown. Alternatively, multiple gratings are disposed in a common film or layer. The relative positions of the switchable gratings 114 in the stack may vary from the example shown.

Other types of scanning technologies may be used to concentrate the light at various positions of the pupil and, thus, produce a wide field of view for both the foveal and peripheral vision of the viewer. For example, the projector 124 may include or be illuminated by a holographic scanner. The holographic scanner may direct the virtual image to the fovea regardless of the position of the fovea. Acousto-optic modulation or electrowetting prisms may alternatively or additionally be used to implement the scanning. In other cases, other types of switchable gratings may be used, including, for instance, switchable Bragg gratings, gratings made of polymer-liquid crystal-polymer (PoLiCryPS) slices, or PoliFEM gratings. In still other cases, switchable Bragg gratings may be used. In yet other cases, the peripheral imagery is provided via a pinlight display system, which may provide a wide field of view using defocused point light sources (e.g., an array of point light sources placed in front of the eye out of focus).

Figure 5:
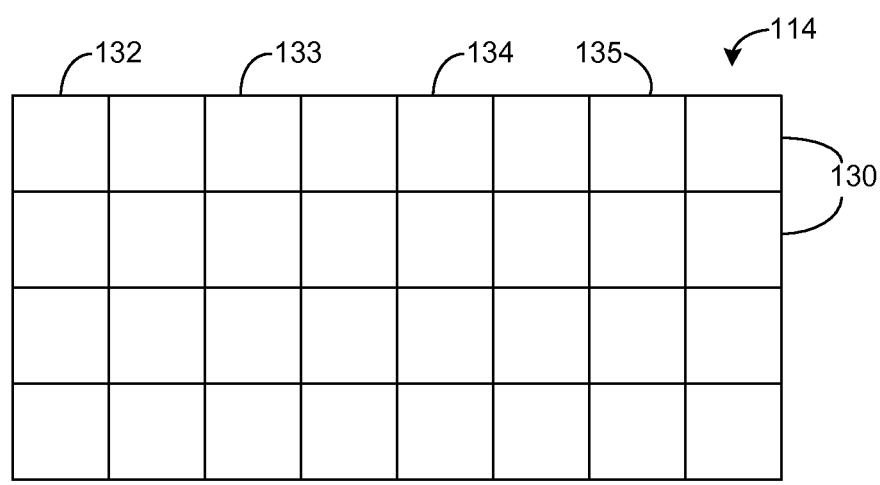
FIG. 5 is a schematic view of a grating of the virtual image display of FIG. 4 in accordance with one example.

FIG. 5 depicts one of the switchable gratings 114 in accordance with one example. Each switchable grating 114 may be pixelated to modulate or adjust the amount of steering provided by the respective switchable grating 114 as a function of position. In this example, the switchable grating 114 has eight columns and four rows of pixels. The number of pixels may vary considerably.

The modulation provided by the pixilation may be useful in fine-tuning the amount of steering. Steering with a constant pitch grating across the entire lateral and vertical extent of the grating 114 may result in defocusing. For instance, when rays concentrate to a point from a wide field of view, the point may not be moved by the addition of a constant pitch grating without unacceptable defocusing. Without the modulation, the deflection resulting from the grating 114 may depend upon the distance (or path length) between the grating 114 and the pupil. The path length may vary considerably over a wide field of view. To avoid the defocusing, each switchable grating 114 may be pixilated, or split up into discrete regions, so that an appropriate amount of steering may be provided in each region. For example, if the grating 114 shown in FIG. 5 is configured to generally provide 2 degrees of steering in the horizontal direction, then individual pixels or regions 132-135 may provide 1.96 degrees, 1.98 degrees, 2.00 degrees, and 2.02 degrees of steering, respectively. The other gratings 114 in the horizontal subset may be similarly pixelated. The activation of the various combinations of gratings 114 may thus result in all rays entering the pupil.

Figure 6:
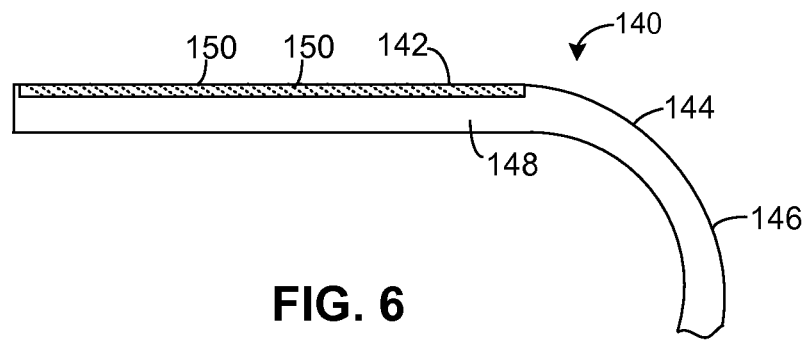
FIG. 6 is a schematic, plan view of a curved waveguide of the virtual image display of FIG. 2 in accordance with one example.

FIG. 6 depicts an exemplary waveguide 140 having a combiner 142 embedded in a waveguide 144. The waveguide 144 may have a curved section 146 and a section 148 in the display viewing area. The combiner 142 is embedded in a rear face of the waveguide 144. In this example, the combiner 142 provides both extraction and redirection functions. The combiner 142 includes a set of volume holograms (schematically depicted at 150) embedded in the section 148 of the waveguide 144. Each volume hologram 150 may be recorded so that rays are extracted after a desired (fixed) or predetermined number of TIR reflections. In this way, extraction from the waveguide 144 is based on the injection angle, as described above. Each volume hologram 150 also reflects or redirects the extracted light toward the viewer. The extracted light is redirected in a predetermined direction established via recording of the volume hologram. Thus, each volume hologram 150 may be configured, when excited, to redirect the light in a direction that differs from the TIR angle of incidence of the light.

The combination of the waveguide 140 and the combiner 142 may be useful because no surface of the waveguide 140 is disposed on an angle. Consequently, the combination may avoid a situation in which the eyes of the viewer are looking through oppositely angled prisms, leading to the viewer being cross-eyed. With the wedge-shaped waveguide, either the rear face or the front face of the wedge-shaped section of the waveguide is disposed on an angle relative to the other display components. In contrast, both front and rear faces of the waveguide 140 are in parallel. As a result, other display components may be stacked or otherwise adjacent the waveguide 140 without further angling or angled offsets.

Embedding the combiner 142 into the waveguide 140 may also result in a thinner device profile. Unlike the wedge-shaped examples described herein, a separate combiner is not added onto the back face of the waveguide 140.

Figure 7:
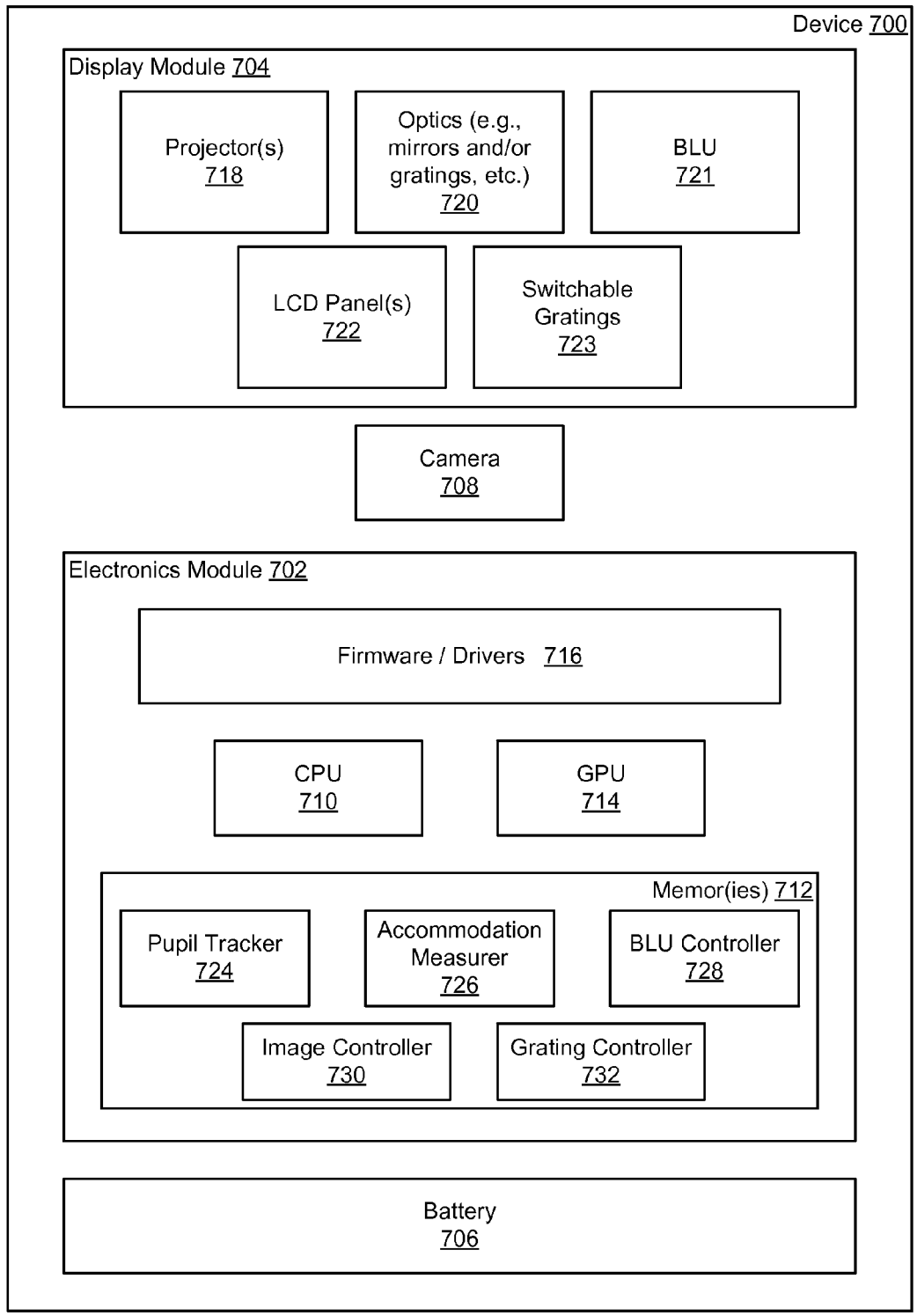
FIG. 7 is a block diagram of an electronic device in which a virtual image display with a curved light path may be used in accordance with one example.

FIG. 7 shows an exemplary electronic device 700 with an electronics module 702 and a display module 704 (or system), a battery 706, and a camera 708. The electronic device 600 may include additional, fewer, or alternative components. For example, the display module 704 may be integrated with the electronics module 702 and/or other components of the electronic device 700 to a varying extent. For instance, the electronics module 702 and/or the display module 704 may include a graphics subsystem of the electronic device 700. Any number of display modules or systems 704 may be included. For example, one display system 704 may be provided for each eye of the viewer. Each display system 704 may be configured in accordance with one or more of the examples described above.

The camera 708 is configured to capture data indicative of an image of a pupil of a viewer viewing the display of the device 700. The camera 708 may be any image capture device, including, for instance, a charge coupled device (CCD) image sensor or an active pixel sensor, such as a CMOS sensor. The camera 708 may also be configured to generate data indicative of pupil position. Such data may be alternatively or additionally generated by the electronics module 702.

In this example, the electronics module 702 includes a processor 710 and one or more memories 712 separate from the display module 704. The processor 710 and the memories 712 may be directed to executing one or more applications implemented by the device 700. For example, the display module 704 may generate a user interface for an operating environment (e.g., an application environment) supported by the processor 710 and the memories 712. The processor 710 may be a general-purpose processor, such as a central processing unit (CPU), or any other processor or processing unit. Any number of such processors or processing units may be included.

In the example of FIG. 7, the electronics module 702 includes a graphics processing unit (GPU) 714 and firmware and/or drivers 716. The GPU 714 may be dedicated to graphics- or display-related functionality and/or provide general processing functionality. Some of the components of the electronics module 702 may be integrated. For example, the processor 710, the one or more of the memories 712, the GPU 714, and/or the firmware 716 may be integrated as a system-on-a-chip (SoC) or application-specific integrated circuit (ASIC). The electronics module 702 may include additional, fewer, or alternative components. For example, the electronics module 702 may not include a dedicated graphics processor, and instead rely on the CPU 710 or other general-purpose processor to support the graphics-related functionality of the electronic device 700. The electronics module 702 and/or the display module 704 may include additional memory (or memories) to support display-related processing.

In the example of FIG. 7, the display module 704 includes one or more projectors 718, a number of optical components 720, a backlight unit (BLU) 721, one or more LCD panels or units 722, and switchable gratings 723. The projector 718 may be a holographic projector and/or otherwise configured as described above. In some cases (including those that use scanning to produce a wide field of view), the display module 704 includes a high resolution projector for the foveal imagery and a low resolution projector for the peripheral imagery.

Additional, fewer, or alternative display components may be provided. For example, in some cases, such as those that use scanning, the display module 704 does not include the backlight unit 721. In some cases, one or more of the LCD panels are integrated within the projector(s) 718. The switchable gratings 723 may or may not be included depending on whether the peripheral imagery is handled by a separate LCD subsystem, as described above. The display module 704 may include a number of other components, including, for instance, a number of passive optical components, such as a waveguide through which light for a virtual image travels from a projector to a combiner, as described above. The active optical components are shown in the block diagram of FIG. 7 for ease in illustration.

The operation of the display module 704 and the camera 708 may be controlled by the electronics module 702 through the execution of a number of computer-readable instructions (or instruction sets) stored in the memories 712. Any portion of the instruction sets may be executed by the processor 710 or the GPU 714. In this example, the instructions include modules or other instruction sets for a pupil tracker 724, an accommodation measurer 726, a BLU controller 728, an image (or projector) controller 730, and a grating controller 732.

In operation, the camera 708 may be controlled by and otherwise exchange data with the pupil tracker 724. Through the instructions of the pupil tracker 724, the processor 710 may be configured to determine a position of the pupil based on the data captured by the camera 708.

Through the instructions of the accommodation measurer 726, the BLU controller 728, and/or the image controller 730, the processor 710 may be configured to generate one or more control signals to establish the angle at which light is injected into the waveguide, as described above. The projector(s) 718 and/or the optical components 720 (e.g. mirrors) may be configured to adjust the injection angle in accordance with the control signal(s). For instance, the accommodation measurer 726 may be implemented to adjust the focus of the projector(s) 718.

The instructions of the BLU controller 728 may be implemented to control the light source(s) and/or mirror(s) of the BLU 721. Through the instructions of the BLU controller 728, the processor 710 may be configured to control the backlight unit 721 (and/or mirror thereof) in accordance with the position of the pupil to converge the rays of light at the pupil. The instructions of the BLU controller 728 may also be used to control the projector 718 to establish a non-illuminated region, as described above.

The instructions of the image controller 730 may be implemented to control one or more of the LCD panels 722 to provide foveal and peripheral vision imagery. For example, the image controller 730 may be used to compute the holograms for the projector 718 and/or control a beam scanner and/or mirrors used to establish the injection angle. The image controller 730 may also be used to establish a deactivated region of one of the LCD panels 722 through which the light for the foveal imagery passes.

The grating controller 732 may be implemented to control the selective activation of the switchable gratings 723. The gratings 723 may be used in connection with displays that handle the foveal and peripheral imagery through scanning, as described above. Through the implementation of the instructions for the grating controller 732, the processor 710 may be configured to generate control signals to selectively activate one or more of the switchable gratings 723 to steer the light of the virtual image toward the pupil, the position of which may be determined by the pupil tracker 724.

Additional, fewer, or alternative instruction sets or modules may be provided. For example, the device 700 may have instructions stored either for the BLU controller 728 or the grating controller 732, but not both, insofar as the device 700 either uses switchable gratings or a separate LCD system to address the peripheral imagery, as described above.

The device 700 may be configured as one of a wide variety of electronic devices, including, but not limited to, near-eye or other wearable computing or electronic devices, such as eyeglasses, visors, or other head-mounted devices. The device 700 may also be configured as a heads-up electronic display device. Still other possible devices include various types of small-sized displays that nonetheless have a large field of view. Such devices may include wearable and non-wearable devices that may be brought up close to the eye by the user for viewing, as in, for instance, a wristwatch.

In one aspect, a display includes a projector configured to provide light of a virtual image, a waveguide into which the light of the virtual image is injected at an injection angle by the projector, the waveguide being configured to emit the light at a point established by the injection angle, and a combiner disposed along the waveguide and configured to redirect the light of the virtual image. The combiner is further configured to allow ambient light from beyond the waveguide to pass through the combiner. The waveguide constrains the light of the virtual image through total internal reflection along a curved path for the light between the projector and the combiner.

In another aspect, an electronic device includes a camera to capture data indicative of an image of a pupil of a viewer viewing the display, a memory in which pupil tracking instructions and projector control instructions are stored, a processor configured by the pupil tracking instructions to determine a position of the pupil based on the captured data, and a display. The display includes a holographic projector configured to provide light of a virtual image, a waveguide into which the light of the virtual image is injected at an injection angle by the projector, the waveguide being configured to emit the light at a point established by the injection angle, and a combiner disposed along the waveguide and configured to redirect the light of the virtual image. The combiner is further configured to allow ambient light from beyond the waveguide to pass through the combiner. The waveguide constrains the light of the virtual image through total internal reflection along a curved path for the light between the projector and the combiner. The processor is configured by the projector control instructions to generate a control signal to establish the injection angle of the projector.

In yet another aspect, an eyeglass display device includes an eyeglass temple, an eyeglass frame coupled to the eyeglass temple, a projector disposed on the eyeglass temple and configured to provide light of a virtual image, and a waveguide into which the light of the virtual image is injected at an injection angle by the projector. The waveguide includes a first section extending from the projector and along the eyeglass temple, a second section disposed at the eyeglass frame, and a third section disposed between the first and second sections and defining a curved path. The eyeglass display device further includes a combiner disposed at the eyeglass frame along the second section of the waveguide. The combiner is configured to redirect the light of the virtual image, and is further configured to allow ambient light from beyond the waveguide to pass through the combiner. The waveguide constrains the light of the virtual image through total internal reflection along a curved path for the light between the projector and the combiner.

In connection with any one of the aforementioned aspects, the electronic device may alternatively or additionally include any combination of one or more of the following aspects or features. References to a display may refer to an electronic, computing, or other device including a display. The waveguide includes a wedge waveguide section, the wedge waveguide section being tapered to emit the light after a number of reflections within the wedge waveguide section in accordance with the injection angle. The combiner includes a set of volume holograms embedded in the waveguide in a section of the waveguide, each volume hologram of the set of volume holograms being configured to extract the light from the waveguide in accordance with the injection angle and redirect the extracted light in a predetermined direction established via recording of the volume hologram. The waveguide includes a first section disposed along an eyeglass temple, a second section disposed along the combiner, and a third section disposed between the first and second sections and defining the curved path. The display further includes a camera to capture data indicative of an image of a pupil of a viewer viewing the display, and a processor configured to determine a position of the pupil based on the captured data, and further configured to generate a control signal to establish the injection angle of the projector, in which the projector is configured to adjust the injection angle in accordance with the control signal. The display further includes a scanner configured to concentrate the light redirected by the combiner at a plurality of possible positions of the pupil. The scanner includes a stack of switchable gratings disposed between the combiner and the pupil, and the processor is further configured to generate further control signals to selectively activate one or more respective switchable gratings of the set of switchable gratings to steer the light redirected by the combiner toward a respective one of the plurality of possible positions of the pupil. The stack of switchable gratings includes a first subset of switchable gratings to steer the light horizontally to one of a plurality of horizontal position offsets, and a second subset of switchable gratings to steer the light vertically to one of a plurality of vertical position offsets. Each switchable grating of the set of switchable gratings is pixelated to modulate an amount of steering provided by the respective switchable grating as a function of position. The display further includes a peripheral vision system, the peripheral vision system including a backlight unit configured to generate converging rays of light, and a liquid crystal display (LCD) panel illuminated by the converging rays, in which the processor is configured to control the backlight unit in accordance with the position of the pupil to converge the rays of light at the pupil, and to control the LCD panel to provide peripheral vision imagery and to establish a deactivated region of the LCD panel through which the light emitted from the waveguide passes to reach a fovea of the viewer. The backlight unit includes an array of volume holograms, each volume hologram being configured to direct the rays to a respective pupil position upon excitation. The peripheral vision imagery has a lower resolution than the virtual image provided by the light from the waveguide. The projector is a holographic projector configured to correct for aberration arising from the curved path. The waveguide includes a wedge waveguide section, the wedge waveguide section being tapered to emit the light after a number of reflections within the wedge waveguide section in accordance with the injection angle, and the combiner includes a grating disposed along the wedge waveguide section. The combiner includes a set of volume holograms embedded in the waveguide in a section of the waveguide, each volume hologram of the set of volume holograms being configured to extract the light from the waveguide in accordance with the injection angle and redirect the extracted light in a predetermined direction established via recording of the volume hologram. The display further includes a peripheral vision system, the peripheral vision system including a backlight unit configured to generate converging rays of light, a liquid crystal display (LCD) panel illuminated by the converging rays, and a polarizer disposed between the LCD panel and the viewer to filter an output of the LCD panel. The processor is configured to control the backlight unit in accordance with the position of the pupil to converge the rays of light at the pupil, and to control the LCD panel to provide peripheral vision imagery and to establish a non-illuminated region of the LCD panel through which the light emitted from the waveguide passes to reach a fovea of the viewer. The second section of the waveguide is tapered to emit the light after a number of reflections within the wedge waveguide section in accordance with the injection angle. The combiner includes a set of volume holograms embedded in the waveguide in a section of the waveguide, each volume hologram of the set of volume holograms being configured to extract the light from the waveguide in accordance with the injection angle and redirect the extracted light in a predetermined direction established via recording of the volume hologram.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A display comprising:
   a projector configured to provide light of a virtual image;
   a waveguide into which the light of the virtual image is injected at an injection angle by the projector, wherein the waveguide is configured to emit the light at a point established by the injection angle; and
   a combiner disposed along the waveguide and configured to redirect the light of the virtual image, the combiner being further configured to allow ambient light from beyond the waveguide to pass through the combiner;
   wherein:
   the waveguide constrains the light of the virtual image through total internal reflection along a curved path for the light between the projector and the combiner;
   the combiner is transparent at wavelengths other than wavelengths of the light of the virtual image provided by the projector; and
   the combiner redirects the wavelengths of the light of the virtual image provided by the projector.

2. The display of claim 1, wherein the waveguide comprises a wedge waveguide section, the wedge waveguide section being tapered to emit the light after a number of reflections within the wedge waveguide section in accordance with the injection angle.

3. The display of claim 1, wherein the combiner comprises a set of volume holograms embedded in the waveguide in a section of the waveguide, each volume hologram of the set of volume holograms being configured to extract the light from the waveguide in accordance with the injection angle and redirect the extracted light in a predetermined direction established via recording of the volume hologram.

4. The display of claim 1, wherein the waveguide comprises a first section disposed along an eyeglass temple, a second section disposed along the combiner, and a third section disposed between the first and second sections and defining the curved path.

5. The display of claim 1, further comprising:
   a camera to capture data indicative of an image of a pupil of a viewer viewing the display; and
   a processor configured to determine a position of the pupil based on the captured data, and further configured to generate a control signal to establish the injection angle of the projector; and
   wherein the projector is configured to adjust the injection angle in accordance with the control signal.

6. The display of claim 5, further comprising a scanner configured to concentrate the light redirected by the combiner at a plurality of possible positions of the pupil.

7. The display of claim 6, wherein:
   the scanner comprises a stack of switchable gratings disposed between the combiner and the pupil; and the processor is further configured to generate further control signals to selectively activate one or more respective switchable gratings of the set of switchable gratings to steer the light redirected by the combiner toward a respective one of the plurality of possible positions of the pupil.

8. The display of claim 7, wherein the stack of switchable gratings comprises:
a first subset of switchable gratings to steer the light horizontally to one of a plurality of horizontal position offsets; and
a second subset of switchable gratings to steer the light vertically to one of a plurality of vertical position offsets.

9. The display of claim 7, wherein each switchable grating of the set of switchable gratings is pixelated to modulate an amount of steering provided by the respective switchable grating as a function of position.

10. The display of claim 5, further comprising a peripheral vision system, the peripheral vision system comprising:
a backlight unit configured to generate converging rays of light; and
a liquid crystal display (LCD) panel illuminated by the converging rays;
wherein the processor is configured to control the backlight unit in accordance with the position of the pupil to converge the rays of light at the pupil, and to control the LCD panel to provide peripheral vision imagery and to establish a deactivated region of the LCD panel through which the light emitted from the waveguide passes to reach a fovea of the viewer.

11. The display of claim 10, wherein the backlight unit comprises an array of volume holograms, each volume hologram being configured to direct the rays to a respective pupil position upon excitation.

12. The display of claim 10, wherein a region of the backlight unit does not provide light to the LCD panel to establish a non-illuminated region of the LCD panel to avoid conflict with the light emitted from the waveguide to reach the fovea of the viewer.

13. The display of claim 1, wherein the projector is a holographic projector configured to correct for aberration arising from the curved path.

14. An electronic device comprising:
a camera to capture data indicative of an image of a pupil of a viewer viewing the display;
a memory in which pupil tracking instructions and projector control instructions are stored;
a processor configured by the pupil tracking instructions to determine a position of the pupil based on the captured data; and
a display comprising:
a holographic projector configured to provide light of a virtual image;
a waveguide into which the light of the virtual image is injected at an injection angle by the projector, wherein the waveguide is configured to emit the light at a point established by the injection angle; and
a combiner disposed along the waveguide and configured to redirect the light of the virtual image, the combiner being further configured to allow ambient light from beyond the waveguide to pass through the combiner;
wherein:
the waveguide constrains the light of the virtual image through total internal reflection along a curved path for the light between the projector and the combiner;
the processor is configured by the projector control instructions to generate a control signal to establish the injection angle of the projector;
the combiner is transparent at wavelengths other than wavelengths of the light of the virtual image provided by the projector; and
the combiner redirects the wavelengths of the light of the virtual image provided by the projector.

15. The electronic device of claim 14, wherein the waveguide comprises a wedge waveguide section, the wedge waveguide section being tapered to emit the light after a number of reflections within the wedge waveguide section in accordance with the injection angle.

16. The electronic device of claim 15, wherein the combiner comprises a grating disposed along the wedge waveguide section.

17. The electronic device of claim 14, wherein the combiner comprises a set of volume holograms embedded in the waveguide in a section of the waveguide, each volume hologram of the set of volume holograms being configured to extract the light from the waveguide in accordance with the injection angle and redirect the extracted light in a predetermined direction established via recording of the volume hologram.

18. The electronic device of claim 14, further comprising a peripheral vision system, the peripheral vision system comprising:
a backlight unit configured to generate converging rays of light;
a liquid crystal display (LCD) panel illuminated by the converging rays; and
a polarizer disposed between the LCD panel and the viewer to filter an output of the LCD panel;
wherein the processor is configured to control the backlight unit in accordance with the position of the pupil to converge the rays of light at the pupil, and to control the LCD panel to provide peripheral vision imagery and to establish a non-illuminated region of the LCD panel through which the light emitted from the waveguide passes to reach a fovea of the viewer.

19. An eyeglass display device comprising:
an eyeglass temple;
an eyeglass frame coupled to the eyeglass temple;
a projector disposed on the eyeglass temple and configured to provide light of a virtual image;
a waveguide into which the light of the virtual image is injected at an injection angle by the projector, the waveguide comprising a first section extending from the projector and along the eyeglass temple, a second section disposed at the eyeglass frame, and a third section disposed between the first and second sections and defining a curved path; and
a combiner disposed at the eyeglass frame along the second section of the waveguide, the combiner being configured to redirect the light of the virtual image, and being further configured to allow ambient light from beyond the waveguide to pass through the combiner;
wherein:
the waveguide constrains the light of the virtual image through total internal reflection along a curved path for the light between the projector and the combiner;
the combiner is transparent at wavelengths other than wavelengths of the light of the virtual image provided by the projector; and
the combiner redirects the wavelengths of the light of the virtual image provided by the projector.

20. The eyeglass display device of claim 19, wherein the second section of the waveguide being tapered to emit the light after a number of reflections within the wedge waveguide section in accordance with the injection angle.

21. The eyeglass display device of claim 19, wherein the combiner comprises a set of volume holograms embedded in the waveguide in a section of the waveguide, each volume hologram of the set of volume holograms being configured to extract the light from the waveguide in accordance with the injection angle and redirect the extracted light in a predetermined direction established via recording of the volume hologram.

\* \* \* \* \*